United States Patent
Blake et al.

(10) Patent No.: US 9,555,804 B2
(45) Date of Patent: Jan. 31, 2017

(54) METHOD AND CONTROL UNIT FOR MONITORING TRAFFIC

(71) Applicant: Jaguar Land Rover Limited, Coventry (GB)

(72) Inventors: Ian Blake, Coventry (GB); James Smith, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/371,098

(22) PCT Filed: Jan. 8, 2013

(86) PCT No.: PCT/EP2013/050213
§ 371 (c)(1),
(2) Date: Jul. 8, 2014

(87) PCT Pub. No.: WO2013/104618
PCT Pub. Date: Jul. 18, 2013

(65) Prior Publication Data
US 2015/0025770 A1    Jan. 22, 2015

(30) Foreign Application Priority Data
Jan. 9, 2012    (GB) .................................. 1200282.0

(51) Int. Cl.
*B60W 30/14*    (2006.01)
*G01S 13/93*    (2006.01)
(Continued)

(52) U.S. Cl.
CPC ........ *B60W 30/14* (2013.01); *B60W 30/18163* (2013.01); *G01S 13/931* (2013.01);
(Continued)

(58) Field of Classification Search
CPC . G08G 1/166; G60W 30/18163; G60W 30/14;
G60W 2750/30; G60W 2550/16; G01S 13/931; G01S 2013/9321; G01S 2013/9332; G01S 2013/935; G01S 2013/9353; G01S 2013/9357
(Continued)

(56) References Cited

U.S. PATENT DOCUMENTS 5,400,864 A    3/1995    Winner et al.
6,114,973 A    9/2000    Winner et al.
(Continued)

FOREIGN PATENT DOCUMENTS

DE    101 14 187 A1    9/2002
DE    10 2007 059 083 A1    6/2008
(Continued)

OTHER PUBLICATIONS

Combined Search and Examination Report, GB1300283.7, Jun. 17, 2013, 7 pages.
(Continued)

*Primary Examiner* — Marthe Marc-Coleman
(74) *Attorney, Agent, or Firm* — Myers Bigel, P.A.

(57) ABSTRACT

The present invention relates to a method of identifying the hand of traffic applicable to a subject vehicle (3). The subject vehicle (3) travels in a first direction and has a first side and a second side. The method comprises tracking at least a first object vehicle (V) on the first side of the subject vehicle (3), and/or detecting the presence or absence of at least a first stationary target (T) on the first side of the subject vehicle (3). A direction of travel of each first object vehicle (V) is determined in relation to the subject vehicle (3). The hand of traffic is identified based on the direction of travel of each first object vehicle (V), and/or the presence or absence of each first stationary target (T). The invention also relates to a method of implementing Adaptive Cruise Control (ACC) using the hand of traffic information. The invention also
(Continued)

relates to a control unit (1) for determining the hand of traffic.

20 Claims, 9 Drawing Sheets

(51) Int. Cl.
    *G08G 1/16* (2006.01)
    *B60W 30/18* (2012.01)
(52) U.S. Cl.
    CPC ......... *G08G 1/166* (2013.01); *B60W 2550/16* (2013.01); *B60W 2750/30* (2013.01); *G01S 2013/935* (2013.01); *G01S 2013/9321* (2013.01); *G01S 2013/9332* (2013.01); *G01S 2013/9353* (2013.01); *G01S 2013/9357* (2013.01)
(58) Field of Classification Search
    USPC ............ 701/93, 96, 301; 180/169, 170, 179; 340/903; 342/455
    See application file for complete search history.

(56) References Cited

U.S. PATENT DOCUMENTS

| | | | |
|---|---|---|---|
| 6,842,687 B2 * | 1/2005 | Winner et al. | 701/93 |
| 7,482,916 B2 * | 1/2009 | Au et al. | 340/475 |
| 7,840,330 B2 * | 11/2010 | Heinrichs-Bartscher | 701/96 |
| 8,543,310 B2 * | 9/2013 | Kashi et al. | 701/96 |
| 2002/0021229 A1 | 2/2002 | Stein | |
| 2003/0163239 A1 * | 8/2003 | Winner et al. | 701/93 |
| 2005/0209764 A1 | 9/2005 | Schroder | |
| 2009/0102629 A1 * | 4/2009 | Kaller | B60Q 9/008 340/435 |
| 2009/0157286 A1 | 6/2009 | Saito et al. | |
| 2011/0196592 A1 | 8/2011 | Kashi et al. | |

FOREIGN PATENT DOCUMENTS

| | | |
|---|---|---|
| EP | 1 520 745 A2 | 4/2005 |
| EP | 1520745 A2 * | 4/2005 |
| GB | 2 317 256 A | 3/1998 |
| JP | 60-261736 | 12/1985 |
| JP | 2004-525814 A | 8/2004 |
| JP | 2005-104462 A | 4/2005 |
| JP | 2008-068751 A | 3/2008 |
| WO | WO 2004/045895 A1 | 6/2004 |

OTHER PUBLICATIONS

Combined Search and Examination Report, GB1200282.0, May 8, 2012, 7 pages.

Notice of Reason(s) for Refusal, Japan Patent Application No. 2014-550719, Nov. 4, 2015, 11 pages.

* cited by examiner

TABLE A

| Input conditions | | | Output judgement | |
|---|---|---|---|---|
| Relative Speed | Position | Absolute speed | Oncoming | Same direction |
| +faster | Right | +(same direction) | 0 | DOR+ |
| +faster | Left | +(same direction) | 0 | DOL+ |
| -slower | Right | +(same direction) | 0 | DOL+ |
| -slower | Left | +(same direction) | 0 | DOR+ |
| | Right | -(oncoming) | DOL+ | 0 |
| | Left | -(oncoming) | DOR+ | 0 |

METHOD AND CONTROL UNIT FOR MONITORING TRAFFIC

RELATED APPLICATIONS

This application is a 35 U.S.C. §371 national stage application of PCT Application No. PCT/EP2013/050213, filed on Jan. 8, 2013, which claims priority from Great Britain Patent Application No. 1200282.0, filed Jan. 9, 2012, the contents of which are incorporated herein by reference in their entireties. The above-referenced PCT International Application was published in the English language as International Publication No. WO 2013/104618 A2 on Jul. 18, 2013.

TECHNICAL FIELD

The present invention relates to a method and control unit for monitoring traffic in relation to a subject motor vehicle. More particularly, but not exclusively, the present invention relates to a method and a control unit for determining the prevailing hand of traffic, either left-hand or right-hand traffic. Aspects of the invention relate to a method, to a module, to a system and to a vehicle.

BACKGROUND OF THE INVENTION

It is known to provide motor vehicles with Adaptive Cruise Control (ACC) which is operable to adjust the cruising speed of the subject vehicle to respond to traffic conditions. For example, the ACC can reduce the vehicle speed as the subject vehicle approaches a vehicle travelling slower than a cruise speed specified by the driver. When the driver pulls out from behind the slower vehicle, the ACC will automatically accelerate to resume the specified speed. A radar tracking system is typically provided to track object vehicles and provide control data to the ACC.

Figure 1A:
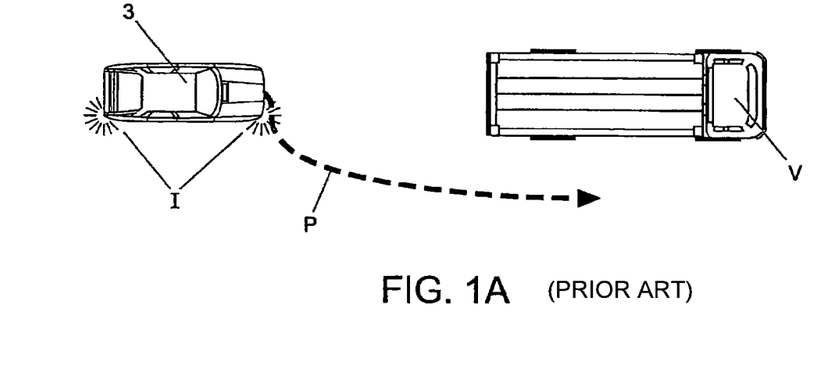
FIGS. 1A and 1B illustrate pathways followed by a vehicle with and without an indicator-initiated acceleration surge function.

A desired feature of ACC is that the resumption to the specified speed starts quickly when the driver starts to pull out. However, there can be a delay before the radar can determine that the road ahead is clear and, therefore, initiation of the vehicle acceleration may be delayed. A typical pathway P for a vehicle operating in this mode is illustrated in FIG. 1A.

Figure 1B:
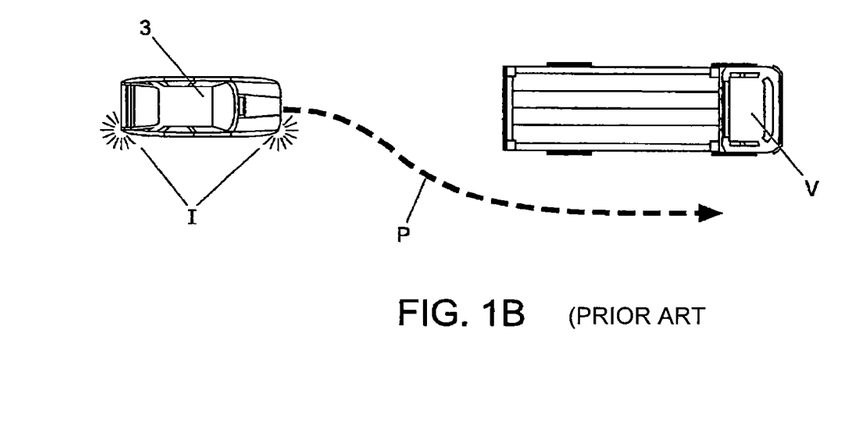

To reduce any such delay, it is known to use indicator information to initiate an acceleration surge (also referred to as indicator surge) when the driver indicates to pull out. When the driver operates the vehicle indicators to signal a manoeuvre, the vehicle automatically accelerates. If the driver does not subsequently pull out, the vehicle will slow again and return to its normal follow distance after a few seconds. If the driver proceeds with the manoeuvre, any delay in returning to the set cruise speed is minimised as the vehicle is already accelerating. A typical pathway P for a vehicle operating in this mode is illustrated in FIG. 1B.

Figure 2:
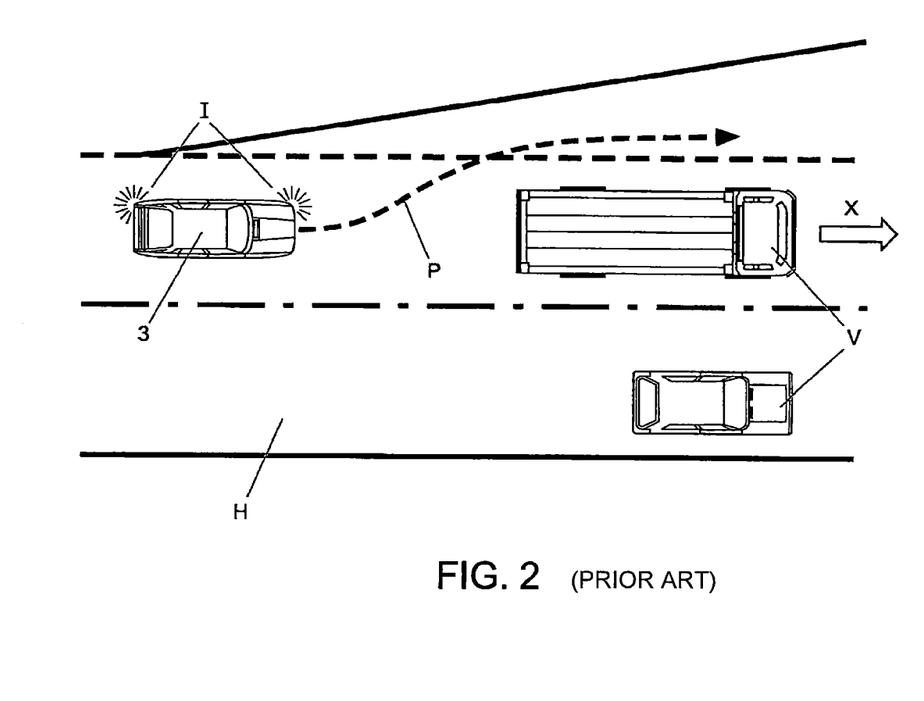
FIG. 2 illustrates an example of unwanted engagement of the acceleration surge function as a vehicle leaves a highway.

One disadvantage of this technique is that when indicating to take an exit ramp from a highway (to the left in regions such as the UK having left-hand traffic), the same acceleration surge function will be triggered, as illustrated by the vehicle pathway P in FIG. 2. The resulting increase in the vehicle speed can prove disconcerting in these circumstances. To address this, the acceleration surge function could be keyed to the hand of traffic of the vehicle (i.e. right-hand traffic, or left-hand traffic) based on its home market. However, any such keyed response would become incorrect if the vehicle is taken out of market (e.g. if a UK car is driven on the continent).

The present invention sets out to address at least some of the shortcomings associated with prior art systems.

SUMMARY OF THE INVENTION

In a first aspect, the present invention provides a method of operating an Adaptive Cruise Control of a subject vehicle, travelling in a first direction and having a first side and a second side, wherein an acceleration surge function is operable when an indicator is actuated by a driver to signal a driving manoeuvre to said first side or said second side, the method comprising:
  identifying the hand of traffic; and
  inhibiting the acceleration surge function when the signalled driving manoeuvre is on the same side of the subject vehicle as the hand of traffic.

Thus, the acceleration surge function can be inhibited when the driver indicates a manoeuvre to the left side of the subject vehicle when driving in left-hand traffic; or to the right side of the subject vehicle when driving in right-hand traffic.

By determining the current hand of drive applicable to the subject vehicle, the ACC can tailor vehicle operations, for example to allow correct reaction to an indicator signal by the driver. This can enable a surge of acceleration when pulling out under ACC control, which gives an impression of more responsive control to the driver. The method can comprise outputting an engine speed increase instruction in response to receipt of the indicator signal. The instruction can, for example, be output to an engine control module to increase the engine speed.

The method can determine whether the acceleration surge is appropriate for the signalled manoeuvre. If the subject vehicle is operating in left-hand traffic, an acceleration surge is appropriate when indicating right, but not if indicating left (such as on an exit ramp). By identifying the hand of traffic, the appropriate action can be initiated even when the car is taken out of its home market. The method can be swapped or inhibited as desired.

The hand of traffic may be identified by a user input, for example by operating a control on the dashboard. Alternatively, the hand of the traffic may be identified automatically, or by any other suitable method.

Identifying the hand of traffic may comprise:
  (a) tracking at least a first object vehicle on said first side of the subject vehicle, and/or detecting the presence or absence of at least a first stationary target on said first side of the subject vehicle;
  (b) determining a direction of travel of each first object vehicle in relation to the subject vehicle; and
  (c) identifying the hand of traffic based on the direction of travel of each first object vehicle, and/or the presence or absence of each first stationary target.

The method can be used to determine whether the hand of traffic is to the right (i.e. right-hand traffic where vehicles drive on the right-hand side of the road), or to the left (i.e. left-hand traffic where vehicles drive on the left-hand side of the road). The method can track oncoming vehicles (i.e. vehicles travelling in the opposite direction to the subject vehicle) and/or same direction vehicles (i.e. vehicles travelling in the same direction as the subject vehicle). The first stationary target may, for example, be a parked vehicle, street furniture, or a barrier.

The method can comprise operating a tracking device on the subject vehicle to track each first object vehicle and/or each first stationary target. The tracking device can comprise a radar, optical or infra-red tracking system. The tracking device can measure the speed of each first object vehicle and this can be combined with a measured speed of the subject vehicle to determine whether each first object vehicle is travelling in the same direction or in the opposite direction to the subject vehicle.

The method at step (c) can comprise comparing the direction of travel of each first object vehicle to the first direction of travel of the subject vehicle. The hand of traffic can be identified as corresponding to the first side of the subject vehicle when each first object vehicle on the first side is travelling in the same direction as the subject vehicle. Conversely, the hand of traffic can be identified as corresponding to the second side of the subject vehicle if each first object vehicle on the first side of the subject vehicle is travelling in the opposite direction to the subject vehicle.

The method can also compare the speed of each first object vehicle in relation to that of the subject vehicle. Where each first object vehicle is travelling in the same direction as the subject vehicle, tracking faster vehicles on the right side and/or slower vehicles on the left side of the subject vehicle can indicate a drive on left situation (i.e. left-hand traffic). Conversely, tracking slower vehicles on the right side and/or faster vehicles on the left side of the subject vehicle can indicate a drive on right scenario (i.e. right-hand traffic).

The tracking of each first object vehicle in step (a) can comprise one or more of the following: (i) measuring the speed of each first object vehicle; (ii) measuring the distance to each first object vehicle; (iii) identifying the position of each first object vehicle in relation to the subject vehicle; and (iv) the direction of travel of each first object vehicle.

The tracking of each first object vehicle in step (a) can comprise measuring the speed of each first object vehicle. The method whereby the direction of travel of each vehicle is determined in step (b) comprises comparing the measured speed of each first object vehicle with an actual speed of the subject vehicle. The method can comprise operating a processor to perform step (b) and/or step (c).

The method described herein can comprise repeating steps (a) and (b) for a plurality of first object vehicles. The hand of traffic identified in step (c) can be based on statistical analysis performed on a pre-set minimum number of object vehicles travelling in the same direction as the subject vehicle and/or object vehicles travelling in the opposite direction to the subject vehicle. Only when a sufficient data set has been established of object vehicles travelling in the same direction and/or in the opposite direction, is the hand of traffic determined.

The steps (a) and (b) of the method can be repeated for at least a second object vehicle tracked on the second side of the subject vehicle; and/or at least a second stationary target detected on the second side of the subject vehicle. By tracking each second object vehicle and/or a second stationary target on the second side of the subject vehicle, the method can look at oncoming vehicles and same direction vehicles. The second stationary target may, for example, be a parked vehicle, street furniture, or a barrier.

The tracking of the first and second object vehicles can be performed by the same tracking system, or by different tracking systems. Similarly, tracking the first and second stationary targets can be performed by the same tracking system, or by different tracking systems.

The step of tracking each second object vehicle can comprise measuring the speed of each second object vehicle. The direction of travel of each second object vehicle can be determined by comparing the measured speed of each second object vehicle with an actual speed of the subject vehicle The hand of traffic identified in step (c) can be based on monitoring a plurality of first object vehicles travelling in the same direction as the subject vehicle and a plurality of second object vehicles travelling in the opposite direction to the subject vehicle. Equally, the hand of traffic can be identified in step (c) by comparing the relative speed of vehicles travelling in the same direction on the first and second sides of the subject vehicle.

As an extension, the method can also be used to determine (when indicating out) if the acceleration surge should be inhibited, either because this will result in following an outside lane vehicle closely, or if the car is already in the outside lane and therefore cannot pull out. The acceleration surge function can be inhibited when it is determined that the distance between the subject vehicle and a first object vehicle or a second object vehicle on the side of the vehicle corresponding to the signalled driving manoeuvre is less than a predefined threshold.

In a still further aspect, the present application relates to a method of operating an ACC of a subject vehicle to prevent undertaking, the method comprising identifying the hand of traffic in accordance with the method described herein, wherein a speed of the subject vehicle is reduced if it is determined that the subject vehicle will undertake each first object vehicle or each second object vehicle based on the identified hand of traffic. The method could comprise applying the brakes to avoid undertaking, but this would be unexpected by following drivers. Instead, the method can comprise the step of reducing engine drive, or inhibiting acceleration.

The ACC can output an engine control signal for controlling the speed of the subject vehicle. An engine speed reduction signal can be output to reduce the engine speed and, accordingly, the speed of the subject vehicle. Conversely, an engine speed increase signal can be output to increase the engine speed and, accordingly, the speed of the subject vehicle.

Under conventional ACC, a vehicle in an empty left lane may undertake a queue of cars in the middle lane (for left-hand traffic). The method according to the present invention could prevent this operation.

Although not allowed in the UK, undertaking is allowed in other regions, such as the USA, and the method can detect this by sensing the mix of under-/over-taking vehicles. In particular, the method described herein can further comprise the step of: (d) comparing the speed of each first object vehicle and each second object vehicle to identify the presence or absence of undertaking. An undertaking prevention function can be inhibited if it is determined that undertaking is permitted.

In another aspect, the present invention relates to a method of operating an Adaptive Cruise Control of a subject vehicle, the subject vehicle having a first side and a second side, wherein the method comprises: tracking at least a first object vehicle on the first side of the subject vehicle, and/or tracking at least a second object vehicle on the second side of the subject vehicle; an acceleration surge function being operable when an indicator is actuated by a driver to signal a driving manoeuvre to said first side or said second side; wherein the is method comprises inhibiting the acceleration surge function when it is determined that the distance between the subject vehicle and a first object vehicle or a second object vehicle on the side of the vehicle corresponding to the signalled driving manoeuvre is less than a predefined threshold.

In a further aspect, the present invention relates to an Adaptive Cruise Control module for a subject vehicle, the module comprising a tracking device for tracking at least a first object vehicle on a first side of the subject vehicle and/or tracking at least a second object vehicle on a second side of the subject vehicle; a processor for initiating an acceleration surge function when an indicator is operated by a driver to signal a driving manoeuvre to the first side or the second side of the subject vehicle; wherein the processor is configured to inhibit the acceleration surge function when it is determined that the distance between the subject vehicle and a first object vehicle or a second object vehicle on the side of the vehicle corresponding to the signalled driving manoeuvre is less than a predefined threshold.

In a further aspect the present invention relates to one or more computer-readable media having computer-readable instructions thereon which, when executed by a computer, cause the computer to perform all the steps of the method described herein.

Furthermore, the method described herein can be machine-implemented. In a yet further aspect the present invention relates to a computer system comprising: programmable circuitry; and software encoded on at least one computer-readable medium to program the programmable circuitry to implement the method described herein.

In a further aspect, the present invention relates to an ACC module for a subject vehicle, the module comprising a processor for initiating an acceleration surge function when an indicator is operated by a driver to signal a driving manoeuvre to a first side or a second side of the subject vehicle, the processor being configured to:
  identify the hand of the traffic; and
  inhibit the acceleration surge function when the processor determines that the signalled driving manoeuvre is to the same side as the identified hand of traffic.

It may be that the module comprises a tracking device for tracking at least a first object vehicle on a first side of the subject vehicle and/or the presence of at least a first stationary target on said first side of the subject vehicle; the processor being configure to determine a direction of travel of each first object vehicle in relation to the subject vehicle, and to identify the hand of traffic based on the direction of travel of each first object vehicle and/or the presence of each first stationary target detected.

The acceleration surge function can comprise outputting an engine speed increase instruction for increasing the engine speed. The instruction can, for example, be output to an engine control module to increase the engine speed.

The processor can be configured to request a reduction in the speed of the subject vehicle if it determines that the subject vehicle will undertake each first object vehicle or each second object vehicle based on the identified hand of traffic.

The tracking device can also be suitable for tracking at least a second object vehicle on a second side of the subject vehicle; and/or detecting the presence or absence of at least a second stationary target on the second side of the subject vehicle.

The processor can be configured to compare the speed of each first object vehicle and each second object vehicle to identify the presence or absence of undertaking.

The invention also relates to a vehicle incorporating an ACC module as described herein.

The method(s) described herein can be implemented on a computational device comprising one or more processors, such as an electronic microprocessor. The processor(s) can be configured to perform computational instructions stored in memory or in a storage device. The controllers and/or control units described herein can comprise one or more processors configured to perform computational instructions. The present invention also relates to a computer program for controlling a processor, the computer program being executable to cause the processor to operate in accordance with the method(s) described herein.

References herein to the left and right hand sides of the vehicle are to the respective sides of the vehicle when viewed from the rear of the vehicle looking towards the front of the vehicle. The first and second sides of the vehicle can refer to the left and right hand sides respectively; or conversely the right and left hand sides respectively.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example features disclosed in connection with one embodiment are applicable to all embodiments unless such features are incompatible.

BRIEF DESCRIPTION OF THE DRAWINGS

An embodiment of the present invention will now be described, by way of example only, with reference to the accompanying figures, in which.

DETAILED DESCRIPTION

A hand of traffic control unit 1 for determining a prevailing hand of traffic (i.e. left-hand traffic, or right-hand traffic) for a subject vehicle 3 in accordance with the present invention will now be described. The subject vehicle 3 is illustrated as driving in left-hand traffic on a highway H in a first direction X. The expected pathway of the subject vehicle 3 is indicated by a dashed line P.

A hand of traffic is specified in a car configuration data file (initially set by the vehicle manufacturer or supplier) for the intended home market of the vehicle 3. However, the hand of traffic may change if the vehicle 3 is taken to a different country and this may adversely affect vehicle systems. The control unit 1 according to the present invention can identify the local hand of traffic based on analysis of vehicle movements in relation to the subject vehicle 3. By determining the hand of traffic, the control unit 1 can provide an appropriate system response to a driver action, such as an indicator manoeuvre signal.

Figure 3:
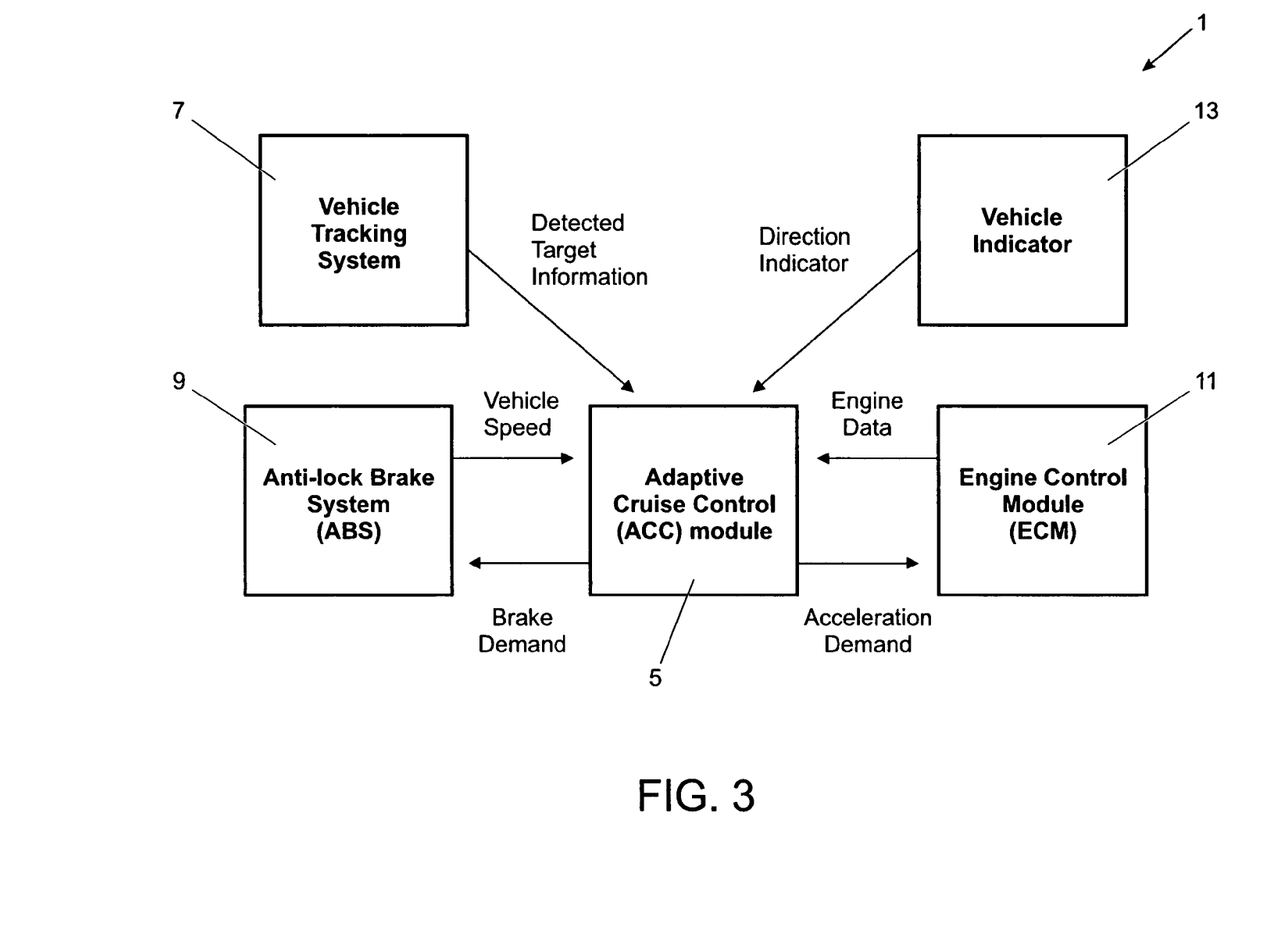
FIG. 3 shows a schematic overview of a control unit according to an embodiment of the present invention.

As illustrated in FIG. 3, the control unit 1 comprises an Adaptive Cruise Control (ACC) module 5 for maintaining the subject vehicle 3 at a cruise speed specified by the driver. The ACC module 5 comprises a microprocessor (not shown) configured to receive data relating to the operating parameters of the subject vehicle 3. Specifically, the ACC module 5 is connected to a vehicle tracking system 7, an anti-lock brake system (ABS) 9, an engine control module (ECM) 11, and a driver operated vehicle indicator 13.

The vehicle tracking system 7 can track an object vehicle (denoted by the reference V) and output tracked vehicle data to the ACC module 5, including the relative speed and direction of travel of the object vehicle V. The ACC module 5 receives real-time data on the absolute speed of the subject vehicle 3 from the ABS 9 and, optionally, can output braking instructions to the ABS 9, for example to initiate braking of the vehicle 3. The ACC module 5 receives engine speed data from the ECM 11 and can output acceleration/deceleration instructions to the ECM 11 to increase/decrease the engine speed. The vehicle indicator 13 is operated by the driver of the vehicle 3 to signal an intended driving manoeuvre to the left hand side or right hand side of the vehicle 3.

The absolute speed of the object vehicle V is calculated by summing the speed of the subject vehicle 3 and the measured relative speed of the object vehicle V. The vehicle tracking system 7 can thereby determine whether the object vehicle V is travelling in the same direction as the subject vehicle 3 or in the opposite direction (i.e. is oncoming traffic). The vehicle tracking system 7 also tracks the position of the object vehicle V in relation to the subject vehicle 3 to determine if it is on the left or right hand side.

The ACC module 5 has a Follow Mode for automatically adjusting the speed of the subject vehicle 3 in response to changes in the speed of a lead object vehicle V. The vehicle tracking system 7 comprises a first forward-facing radar tracking system 15 for tracking object vehicles V and stationary targets T. The first radar tracking system 15 is provided behind the grill of the subject vehicle 3 and can track the position and speed of object vehicles V in front of and to the left and right of the subject vehicle 3. If a slower object vehicle V is detected in front of the subject vehicle 3, the ACC module 5 will output deceleration instructions to the ECM 11 to decrease the engine speed thereby reducing the speed of the subject vehicle 3 to match that of the object vehicle V. If the slower object vehicle V moves out of the path of the subject vehicle 3, the ACC module 5 will automatically output acceleration instructions to the ECM 11 to increase the engine speed to return the subject vehicle 3 to the driver-specified cruise speed. A blind-spot detector 17 is provided for detecting the presence of object vehicles V in a driver's blind spot.

The subject vehicle 3 has indicators on the right- and left-hand sides for signalling driving manoeuvres in the respective directions. The driver controls the indicators in conventional manner using the vehicle indicator 13 which comprises an indicator switch (not shown) mounted on the steering column. The left and right indicators are illustrated in the accompanying Figures as being engaged by outwardly radiating lines referenced as "l".

The ACC module 5 is configured to initiate an acceleration surge when the indicators are engaged to reduce the time elapsed before the vehicle 3 returns to a specified cruise speed when it pulls out to overtake a vehicle, as illustrated in FIG. 1B. There are circumstances in which it is undesirable to initiate such an acceleration surge. For example, when the driver operates the indicators to signal that the vehicle 3 is leaving the highway H (as illustrated in FIG. 2) an acceleration surge might be disconcerting for the driver. To help avoid this type of scenario, the ACC module 5 according to the present invention can selectively inhibit the acceleration surge function.

In particular, the ACC module 5 is configured to inhibit the acceleration surge function when the indicators are engaged to signal a manoeuvre to the side of the subject vehicle 3 corresponding to the identified hand of traffic. If the ACC module 5 determines that the vehicle 3 is operating in a left-hand traffic region, the acceleration surge function would be inhibited when the driver operates the indicators to signal a manoeuvre to the left. Conversely, if the ACC module 5 determines that the vehicle 3 is operating in a right-hand traffic region, the acceleration surge function would be inhibited when the driver operates the indicators to signal a manoeuvre to the right.

The ACC module 5 analyses the local traffic conditions to determine the prevailing hand of traffic in order to control operation of the acceleration surge function. The hand of traffic can be determined by considering the position of the object vehicle V in relation to the subject vehicle 3, the direction of travel of the object vehicle V (same direction or opposite direction) and the relative speed of the object vehicle V.

In the case of oncoming traffic, if a plurality of object vehicles V is detected travelling in the opposite direction on the right-hand side of the subject vehicle 3, this indicates left-hand traffic. Conversely, if a plurality of object vehicles V is detected travelling in the opposite direction on the left-hand side of the subject vehicle 3, this indicates right-hand traffic. Using a count of the object vehicles V with a suitable minimum threshold provides robustness against unusual situations, such as service roads or road works. Tracking oncoming vehicles is appropriate for single carriageway roads where large numbers of oncoming vehicles are encountered.

In the case of same direction vehicles, an object vehicle V moving faster or slower than the subject vehicle 3 can be classified as left or right lane based on whether they are on the respective left or right-hand sides of the subject vehicle 3. Tracking faster object vehicles V on the right side and/or slower object vehicles V on the left side of the subject vehicle 3 indicates left-hand traffic. Conversely, tracking slower object vehicles V on the right side and/or faster object vehicles V on the left side of the subject vehicle indicate right-hand traffic. Again, a minimum threshold of object vehicles V is tracked to provide robustness. Tracking same direction vehicles can be employed in situations where vehicles travelling in the opposite direction may be obscured by a central reservation.

Figure 4:
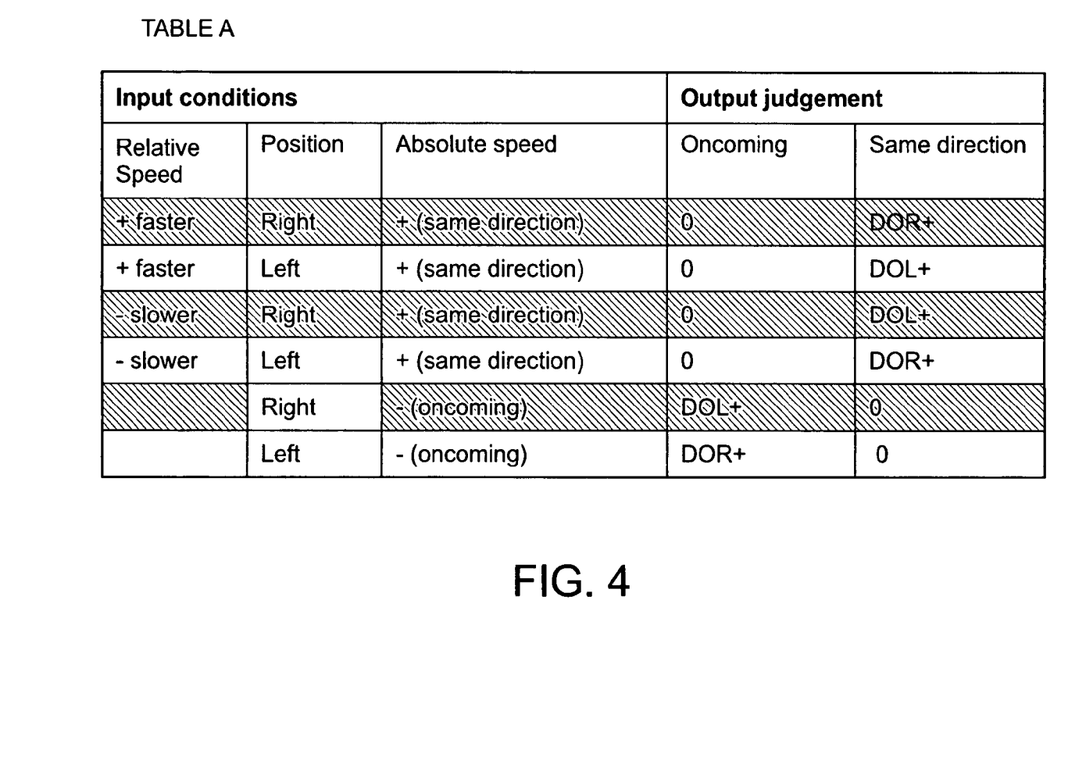
FIG. 4 shows a decision table for a hand of traffic control unit according to an embodiment of the present invention.

The applicable judgement counters to determine the hand of traffic, either left-hand traffic (Drive on Left (DOL)) or right-hand traffic (Drive on Right (DOR)), are summarised in Table A provided in FIG. 4. The relative speed of the subject vehicle 3 is summarised as being faster or slower than the object vehicle V; and the relative position of the object vehicle V is summarised as being on the left or right-hand side of the subject vehicle 3. If the absolute speed of the object vehicle V is positive, the ACC module 5 determines that the subject vehicle 3 and the object vehicle V are travelling in the same direction. Conversely, if the absolute speed of the object vehicle V is negative, the ACC module 5 determines that the subject vehicle 3 and the object vehicle V are travelling in opposite directions. The ACC module 5 performs separate analysis in respect of object vehicles V travelling in the same direction as the subject vehicle 3 and object vehicles V travelling in the opposite direction.

A first analysis is performed for object vehicles V travelling in the same direction as the subject vehicle 3; and a second analysis is performed for object vehicles V travelling in the opposite direction to the subject vehicle 3. A first decision is output following the first analysis of a threshold number of object vehicles V travelling in the same direction as the subject vehicle 3. Similarly, a second decision is output following the second analysis of a threshold number of object vehicles V travelling in the opposite direction to the subject vehicle 3. The minimum threshold for analysis of the object vehicles V travelling in each direction is typically twenty (20) vehicles.

The operation of the control unit 1 is based on said first and second decisions, as follows:

If neither the first decision nor the second decision is available, a fallback decision can be based on the car configuration data or the last detected hand of traffic. The acceleration surge can optionally be inhibited in the absence of a conclusive detected hand of traffic.

If only the first decision or the second decision is available, the decision will be employed provided it matches the car configuration data. Otherwise, the acceleration surge will be inhibited.

If both the first decision and the second decision are available, the acceleration surge will be enabled provided the first and second decisions both match the car configuration data. Otherwise, the acceleration surge will be inhibited.

Figure 5:
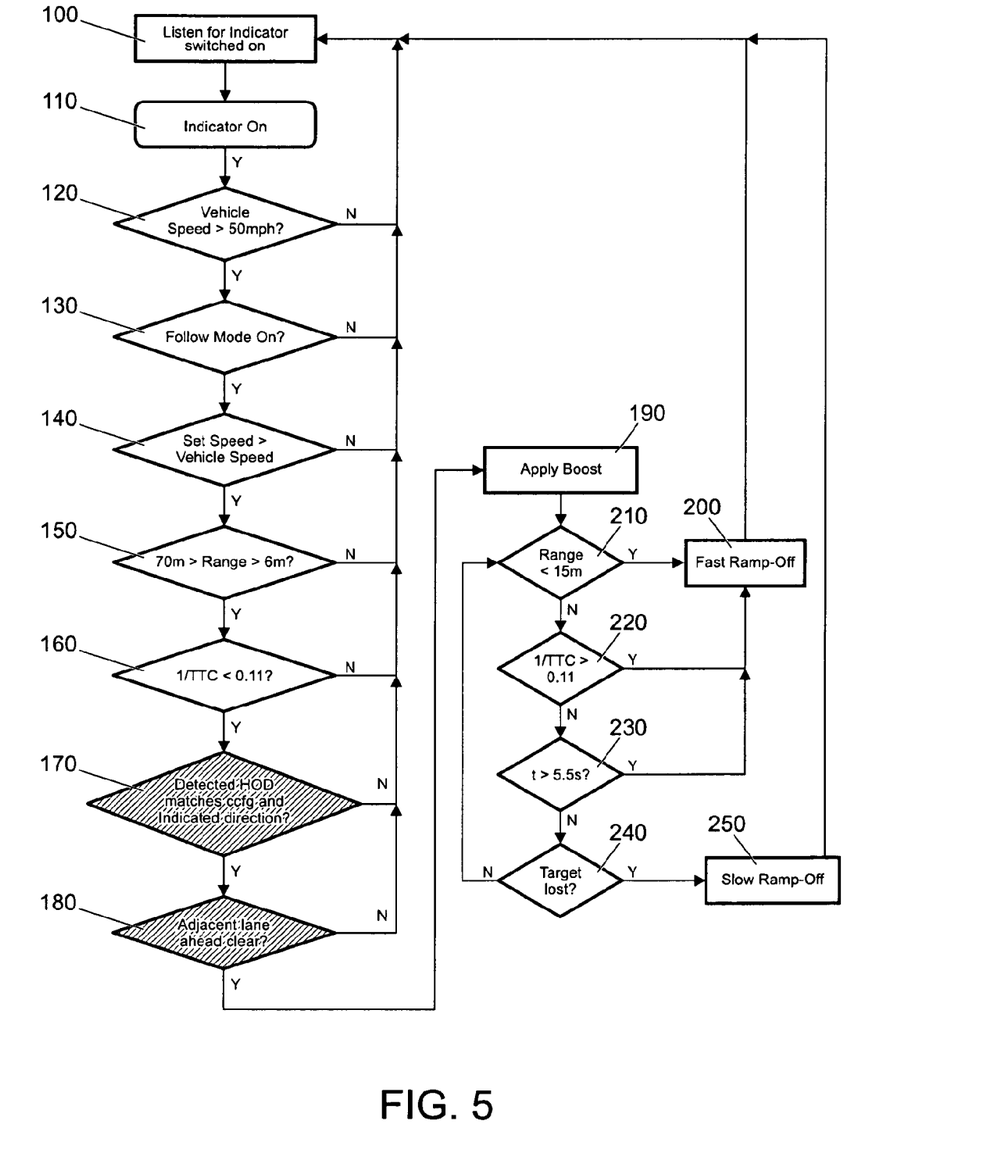
FIG. 5 shows a flow diagram for the hand of traffic control unit.

A summary of the process will now be described with reference to the flow chart in FIG. 5.

A test is performed to determine when the indicators are operated by the driver (STEP 100) and the process is initiated when a left or right indicator is detected (STEP 110).

A test is performed to check that the initial operating conditions are satisfied. If any of these conditions is not met, the process reverts to the original test routine (STEP 100). In the present embodiment, the initial conditions consist of checking that the vehicle speed is greater than 50 mph (STEP 120); that the Follow Mode of the ACC module 5 is engaged (STEP 130); that the speed set in the cruise control is greater than the actual vehicle speed (STEP 140); that the range to the object vehicle V is within a specified range for example less than 70 meters and greater than 16 meters (STEP 150); and that the inverse of the calculated time to collision (TTC) is less than 0.11 (STEP 160).

If the initial conditions are satisfied, a further check is performed to confirm that hand of traffic determined by the first and second decisions match the hand of traffic specified in the car configuration data (STEP 170). A further test is then performed by the first radar tracking system 5 to check that the adjacent lane (in the direction of the signalled manoeuvre) is clear (STEP 180). If the adjacent lane is clear, the acceleration surge is initiated (STEP 190).

A series of cancellation conditions are monitored whilst the acceleration surge is maintained. If any of the cancellation conditions are met, a fast ramp-off from the acceleration surge is initiated (STEP 200). Specifically, the distance to the object vehicle V is measured and if the range falls below 15 meters the acceleration surge is cancelled (STEP 210). If the inverse of the calculated time to collision (TTC) rises above 0.11, the acceleration surge is cancelled (STEP 220). Also, the acceleration surge is terminated after 5.5 seconds (STEP 230).

If the object vehicle V is lost by the first radar tracking system 5, for example if the object vehicle V moves into a different lane, the acceleration surge is terminated (STEP 240). However, a slow ramp-off (STEP 250) is engaged in this scenario to provide a more gradual transition.

Figure 6:
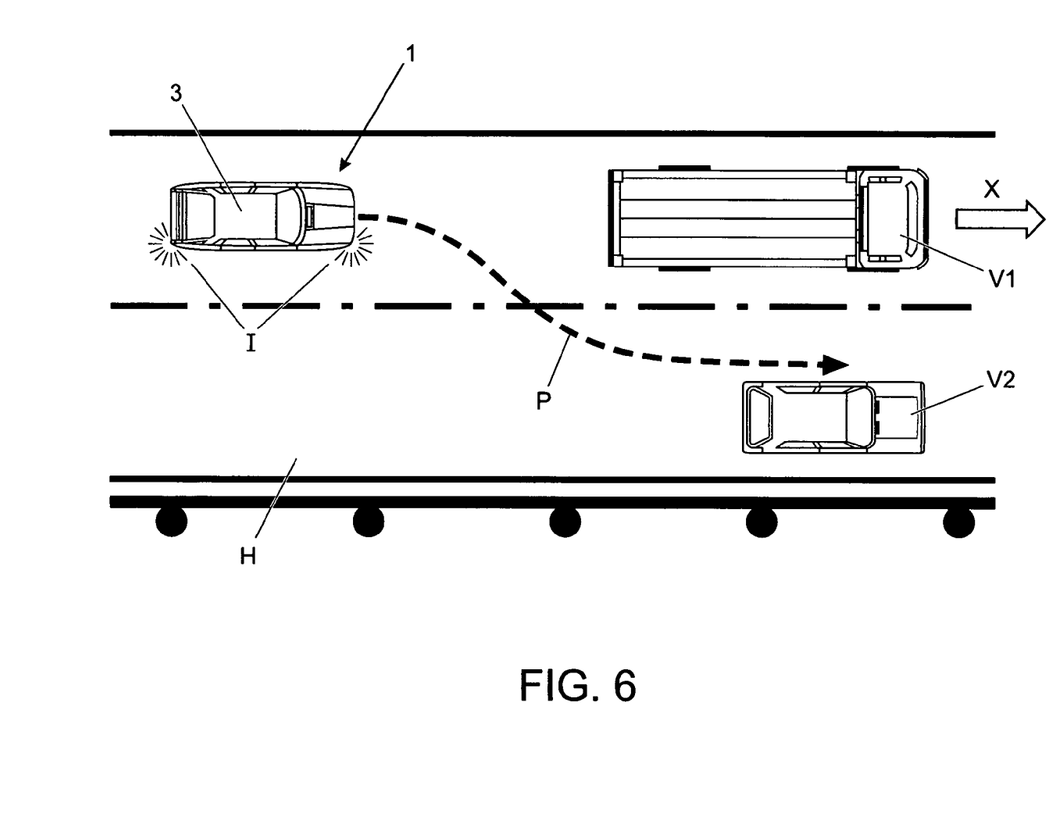
FIG. 6 illustrates inhibiting the acceleration surge function when another vehicle is detected in an outside lane.

As outlined above, the first radar tracking system 5 checks that the adjacent lane in the direction of the signalled manoeuvre is clear before initiating the acceleration surge (STEP 180). If, for example, the indicators are operated to signal an overtaking manoeuvre of a first object vehicle V1, the control unit 1 will check that the adjacent lane to the side of the subject vehicle 3 corresponding to the direction of the signalled drive manoeuvre is clear. As illustrated in FIG. 6, if the first radar tracking system 5 determines that a second object vehicle V2 is occupying the adjacent lane corresponding to the direction of the signalled drive manoeuvre, the acceleration surge is inhibited.

Figure 7:
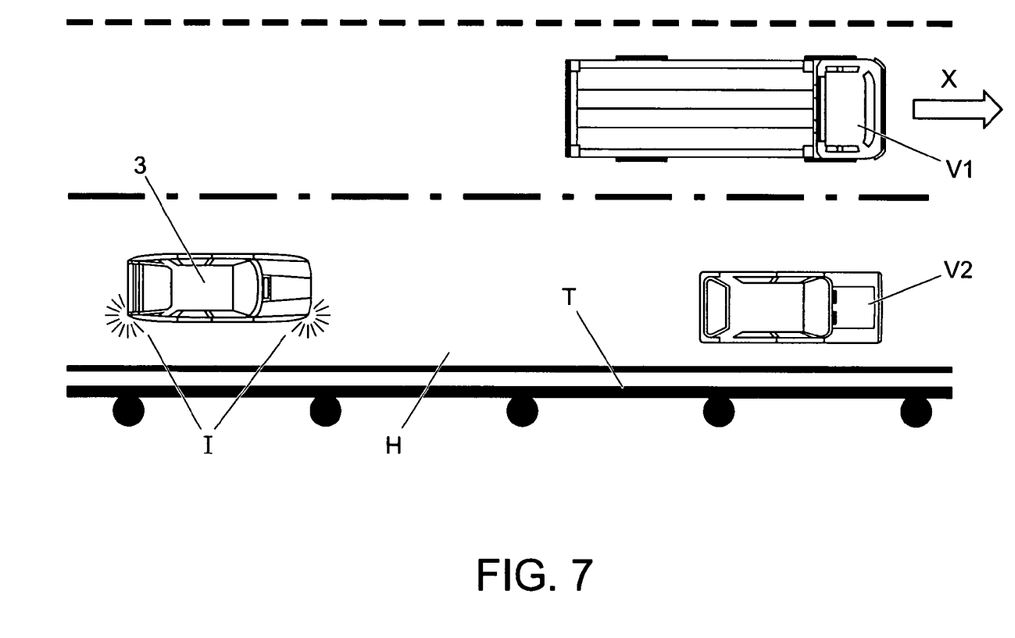
FIG. 7 illustrates detection of a lane position with reference to stationary targets.

The vehicle tracking system 7 can track one or more stationary targets T, such as a central reservation or barrier alongside a highway. As illustrated in FIG. 7, the first radar tracking system 15 detects at least one stationary target T on a right-hand side of the subject vehicle 3. The ACC module 5 determines that the stationary target(s) T indicate that the vehicle 3 is already in the outside (right-hand) lane and, therefore, inhibits the acceleration surge function when the driver indicates a right-hand manoeuvre, for example to overtake a first object vehicle V1. The acceleration surge function would also be inhibited if the distance to a second object (lead) vehicle V2 in front of the subject vehicle 3 is below a threshold limit.

Figure 8:
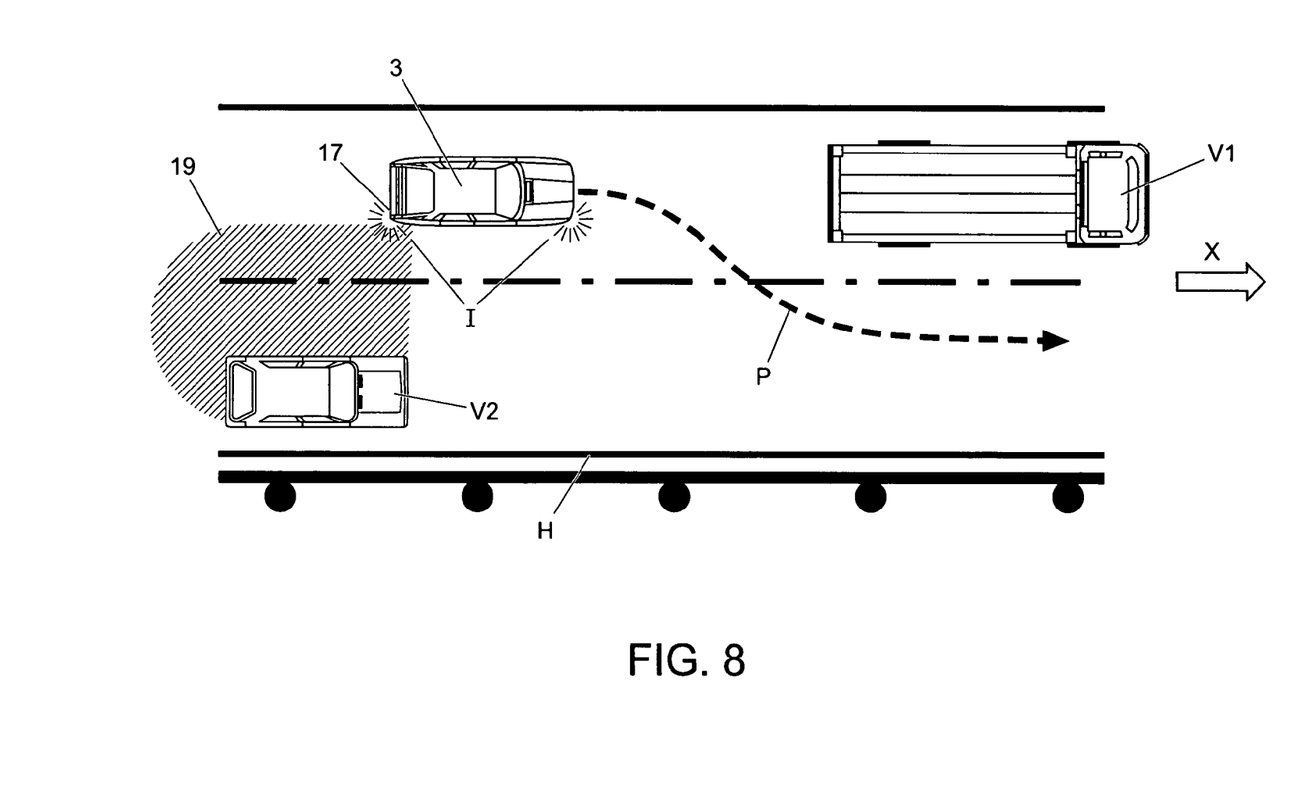
FIG. 8 illustrates inhibiting the acceleration surge function when another vehicle is detected in a blind spot.

The blind-spot detector 17 monitors a blind-spot region 19 to the rear of the vehicle 3 on the driver's side. In the illustration in FIG. 8, the driver indicates a right-hand manoeuvre to overtake a first object vehicle V1 in front of the subject vehicle 3. However, the blind-spot detector 17 senses a second object vehicle V2 in the blind-spot region 19 on the right-hand side of the subject vehicle 3. Accordingly, the acceleration surge is inhibited whilst the object vehicle V is in the blind-spot region 19. An alert can be provided to notify the driver that an object vehicle V is in the blind-spot region 19. It will be appreciated that the blind-spot detector 17 could monitor a blind-spot region on the left-hand side of the vehicle 3.

Figure 9:
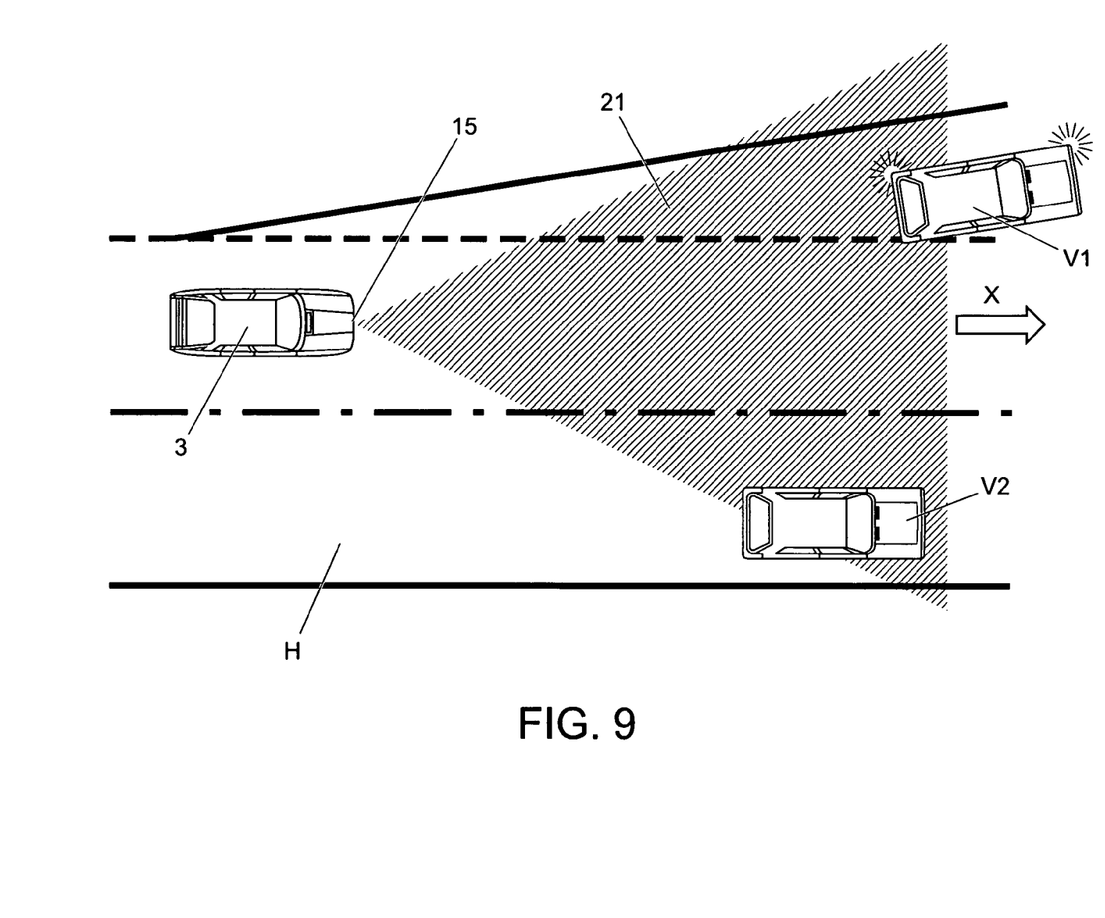
FIG. 9 illustrates controlling an ACC to prevent undertaking.

The ACC module 5 can also operate to prevent undertaking within a radar scanning zone 21. In prior art systems, the ACC will resume the set cruise speed if a first object vehicle V1 ahead of the subject vehicle 3 moves out of the way, for example to leave a highway. As illustrated in FIG. 9, the resulting increase in speed of the subject vehicle 3 by the ACC could result in an undertaking manoeuvre of a second object vehicle V2. The ACC module 5 according to the present invention can identify the hand of traffic and recognise an undertaking scenario. It is envisaged that the ACC module 5 would prevent undertaking if the first and second decisions both indicated the same hand of traffic. Otherwise, it is envisaged that the ACC module 5 would not prevent undertaking.

It will be appreciated that various changes and modifications can be implemented to the embodiment described herein without departing from the spirit and scope of the present invention. The subject vehicle 3 could comprise a second radar tracking system, for example to track object vehicles V behind or on each side the subject vehicle 3. First and second tracking systems could be provided for tracking object vehicles V on the left and right hand sides respectively of the subject vehicle 3. Equally, alternate tracking systems, such as optical or infra-red, could be employed.

The hand of traffic information derived by the ACC module 5 has been described as having particular applications in relation to the operation of the ACC. The traffic information may be applied to other systems, for example headlight alignment, dipping and/or beam pattern.

The invention claimed is:

1. A method of operating an Adaptive Cruise Control of a subject vehicle, travelling in a first direction and having a first side and a second side, the method comprising:
    initiating an acceleration surge function, wherein the acceleration surge function is operable both when an indicator is actuated by a driver to signal a driving maneuver to said first side and when an indicator is actuated by the driver to signal a driving maneuver to said second side;
    identifying a hand of traffic, wherein the identifying the hand of traffic comprises:
        (a) tracking a first object vehicle on said first side of the subject vehicle, and/or detecting a presence or absence of a first stationary target on said first side of the subject vehicle;
        (b) determining a direction of travel of the first object vehicle in relation to the subject vehicle; and
        (c) identifying the hand of traffic based on the direction of travel of the first object vehicle, and/or the presence or absence of the first stationary target; and
    inhibiting the acceleration surge function when the signaled driving maneuver is on the same side of the subject vehicle as the identified hand of traffic.

2. The method of claim 1, wherein step (c) comprises comparing the direction of travel of the first object vehicle to said first direction of travel; the hand of traffic being identified as corresponding to said first side when the first object vehicle on the first side is travelling in the same direction as the subject vehicle.

3. The method of claim 1, wherein step (c) comprises comparing the direction of travel of the first object vehicle to said first direction of travel; the hand of traffic being identified as corresponding to the second side if the first object vehicle on the first side is travelling in the opposite direction to the subject vehicle.

4. The method of claim 1, wherein the tracking of the first object vehicle in step (a) comprises one or more of the following: (i) measuring a speed of the first object vehicle; (ii) measuring a distance to the first object vehicle; (iii) identifying a position of the first object vehicle in relation to the subject vehicle; and (iv) the direction of travel of the first object vehicle.

5. The method of claim 1, wherein steps (a) and (b) are repeated for a plurality of first object vehicles; and the hand of traffic identified in step (c) is based on threshold values for a predetermined number of object vehicles travelling in the same direction as the subject vehicle and/or a predetermined number of object vehicles travelling in the opposite direction to the subject vehicle.

6. The method of claim 1, wherein steps (a) and (b) are repeated for a second object vehicle tracked on the second side of the subject vehicle; and/or a second stationary target detected on the second side of the subject vehicle.

7. The method of claim 6, wherein the hand of traffic identified in step (c) is based on monitoring a plurality of first object vehicles travelling in the same direction as the subject vehicle and a plurality of second object vehicles travelling in the opposite direction to the subject vehicle.

8. The method of claim 7, further comprising the step of:
(d) comparing a speed of each first object vehicle and each second object vehicle to identify a presence or absence of undertaking.

9. The method of claim 1, wherein the tracking of the first object vehicle in step (a) comprises measuring the speed of the first object vehicle; and determining the direction of travel of the first object vehicle in step (b) comprises comparing the measured speed of the first object vehicle with an actual speed of the subject vehicle.

10. The method of claim 1, further comprising reducing a speed of the subject vehicle if it is determined that the subject vehicle will undertake a first object vehicle or a second object vehicle based on the identified hand of traffic.

11. One or more non-transitory computer-readable media having computer-readable instructions thereon which, when executed by a computer, cause the computer to perform all the steps of the method of claim 1.

12. The method of claim 1, wherein, if the hand of traffic cannot be identified in step (c), the acceleration surge function is inhibited to both the first side of the subject vehicle and the second side of the subject vehicle.

13. An Adaptive Cruise Control module for a subject vehicle, the module comprising:
    a tracking device; and
    a processor for initiating an acceleration surge function both when an indicator is operated by a driver to signal a driving maneuver to a first side of the subject vehicle and when an indicator is operated by the driver to signal a driving maneuver to a second side of the subject vehicle, wherein the module is configured to:
    identify a hand of the traffic, comprising:
        (a) tracking a first object vehicle on said first side of the subject vehicle, and/or detecting a presence or absence of a first stationary target on said first side of the subject vehicle;
        (b) determining a direction of travel of the first object vehicle in relation to the subject vehicle; and
        (c) identifying the hand of traffic based on the direction of travel of the first object vehicle, and/or the presence or absence of the first stationary target; and
    inhibit the acceleration surge function when the processor determines that the signaled driving maneuver is to the same side as the identified hand of traffic.

14. The Adaptive Cruise Control module of claim 13, wherein the tracking device is configured to track a first object vehicle on the first side of the subject vehicle and/or tracking a second object vehicle on the second side of the subject vehicle, and wherein the processor is further configured to inhibit the acceleration surge function when it is determined that a distance between the subject vehicle and the first object vehicle or the second object vehicle on the side of the vehicle corresponding to the signaled driving maneuver is less than a predefined threshold.

15. The Adaptive Cruise Control module of claim 13, wherein the tracking device is configured to track a first object vehicle on the first side of the subject vehicle and/or a presence of a first stationary target on said first side of the subject vehicle, and wherein the processor is configured to determine a direction of travel of the first object vehicle in relation to the subject vehicle, and to identify the hand of traffic based on the direction of travel of the first object vehicle and/or the presence of the first stationary target.

16. The Adaptive Cruise Control module of claim 14, wherein the processor is configured to request a reduction in speed of the subject vehicle if it determines that the subject vehicle will undertake the first object vehicle or the second object vehicle based on the identified hand of traffic.

17. The Adaptive Cruise Control module of claim 14, wherein the tracking device is also suitable for tracking the second object vehicle on the second side of the subject vehicle; and/or detecting a presence or absence of a second stationary target on the second side of the subject vehicle.

18. The Adaptive Cruise Control module of claim 17, wherein the processor is configured to compare a speed of the first object vehicle and the second object vehicle to identify a presence or absence of undertaking.

19. A vehicle having an Adaptive Cruise Control module as claimed in claim 13.

20. The Adaptive Cruise Control module of claim 13, wherein, if the hand of traffic cannot be identified in step (c), the module is configured to inhibit the acceleration surge function to both the first side of the subject vehicle and the second side of the subject vehicle.

* * * * *